F. E. SHELDON.
NUT LOCK.
APPLICATION FILED MAR. 5, 1918.
1,299,794.
Patented Apr. 8, 1919.
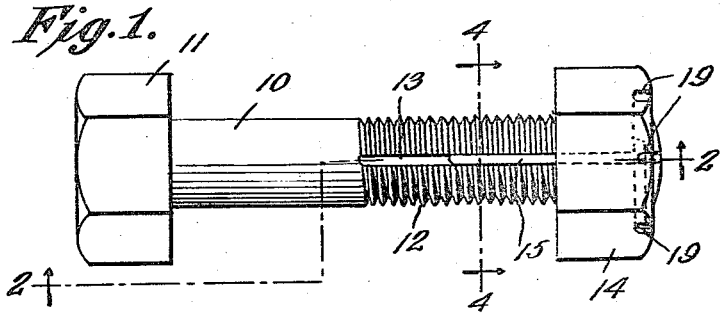
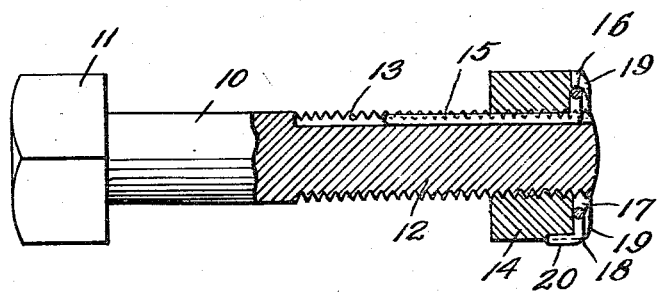
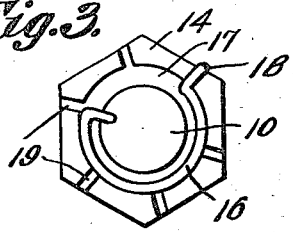
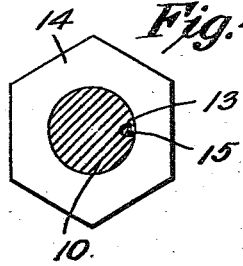
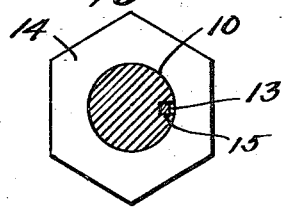
INVENTOR
Fred E. Sheldon,
WITNESSES
ATTORNEY

UNITED STATES PATENT OFFICE.

FRED E. SHELDON, OF SPRINGFIELD, OHIO.

NUT-LOCK.

1,299,794. Specification of Letters Patent. Patented Apr. 8, 1919.

Application filed March 5, 1918. Serial No. 220,544.

*To all whom it may concern:*

Be it known that I, FRED E. SHELDON, a citizen of the United States, residing at Springfield, in the county of Clark and State of Ohio, have invented certain new and useful Improvements in Nut-Locks, of which the following is a specification.

This invention relates to an improved nut lock and the principal object of the invention is to provide a nut lock having an improved locking key and to further provide an improved construction for the nut so that the locking key may be securely held in place and prevented from slipping out of place when in an operative position.

Another object of the invention is to so construct the key and nut that the key may be easily moved to a releasing position when desired, the nut being however, so constructed that the key cannot accidentally move to a releasing position.

Another object of the invention is to provide a nut lock which will be very efficient in operation and at the same time will be simple in construction and easy to make.

This invention is illustrated in the accompanying drawings, wherein:—

Figure 1 is a view showing the improved nut lock in side elevation;

Fig. 2 is a sectional view taken along the line 2—2 of Fig. 1;

Fig. 3 is a view showing the improved nut lock in end elevation;

Fig. 4 is a transverse sectional view taken along the line 4—4 of Fig. 1; and

Fig. 5 is a view similar to Fig. 4 showing a slightly modified construction.

This nut lock includes a bolt 10 having a head 11 and a threaded portion 12 in which will be formed a longitudinally extending slot 13. This slot 13 may be formed either as shown in Fig. 4 or as shown in Fig. 5, the groove being formed as shown in Fig. 4 when the key, to be hereinafter described, is formed of metal circular in cross section and the groove being formed as shown in Fig. 5, when the key is formed of metal which is rectangular in cross section. In other words, the groove will be formed to conform in cross section to the contour of the metal from which the key is made.

The key is to lock the nut 14 upon the bolt and will be formed from a strand of resilient metal bent to provide a shank 15 fitting into the groove 13 and being then bent to provide the collar 16 which collar will, due to its spring action, have a tendency to expand. The collar will fit about the bolt 10 within the undercut groove or seat 17 formed in the outer end face of the nut about the threaded opening through which the bolt passes and when the seat is undercut as clearly shown in Fig. 2, the key cannot move longitudinally when in the position shown and the key cannot accidentally slip out of place. This key terminates in a finger 18 which will pass through one of the openings 19 leading from the seat 17 and is provided with a turned end portion 20 to engage the side face of the nut. By engaging this turned end portion 20 of the finger, the key can be moved out of the radial groove 19 in which it is positioned and sprung out of the seat 17, thus releasing the nut and permitting the nut to be either tightened or loosened as desired. It will thus be seen that the nut can be placed upon the bolt and screwed tight and the key then put in place with the collar fitting into the seat 17 and the finger 18 passing through one of the radial grooves 19 thus securely locking the nut against removal. It will be further seen that while this locking device will securely hold the nut against loosening, the lock may be released when it is desired to remove the nut.

What is claimed is:—

1. A nut lock comprising a bolt having a threaded end portion provided with a longitudinally extending groove, a nut screwed upon the bolt and having its outer end portion provided with an annular groove undercut and provided with radiating grooves leading to the side faces of the nut, and a key for locking the nut against rotation having a shank fitting into the longitudinally extending groove of the bolt and having a collar fitting into the undercut seat of the nut and terminating in a finger extending through one of the radiating grooves of the nut and having its outer end portion bent to engage the side face of the nut.

2. A nut lock comprising a bolt having a threaded end portion provided with a longitudinally extending groove, a nut screwed upon the bolt and provided with an annular seat about the bolt and radiating grooves leading from the annular seat to the side faces of the nut, and a key of resilient material having a shank fitting into a groove of the bolt and provided with a collar fitting into the annular groove of the nut and terminating in a locking finger extending through one of the radiating grooves of the nut.

3. A nut lock comprising a bolt having a threaded end portion provided with a longitudinally extending groove, a nut screwed upon the bolt and provided with an annular seat having radiating grooves leading therefrom, and a locking key having a shank fitting into the groove of the bolt and having a collar fitting into the annular seat of the nut and provided with a locking finger extending through one of the radiating grooves of the nut.

In testimony whereof I affix my signature in presence of two witnesses.

FRED E. SHELDON.

Witnesses:
 CECIL GARNER,
 CHARLES HALL.